US 9,148,625 B2

(12) United States Patent
Kleinsteiber et al.

(10) Patent No.: US 9,148,625 B2
(45) Date of Patent: Sep. 29, 2015

(54) TRANSITION CONTROL IN A VIDEOCONFERENCE

(71) Applicant: Cisco Technology, Inc., San Jose, CA (US)

(72) Inventors: Aaron Kleinsteiber, Sunnyvale, CA (US); J. William Mauchly, Berwyn, PA (US); Jonathan Yang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 200 days.

(21) Appl. No.: 13/624,246

(22) Filed: Sep. 21, 2012

(65) Prior Publication Data
US 2014/0085404 A1 Mar. 27, 2014

(51) Int. Cl.
H04N 7/14 (2006.01)
H04N 7/15 (2006.01)

(52) U.S. Cl.
CPC ...................... *H04N 7/15* (2013.01)

(58) Field of Classification Search
USPC ............. 348/14.01–14.16; 715/852, 863
See application file for complete search history.

(56) References Cited

U.S. PATENT DOCUMENTS

| | | | |
|---|---|---|---|
| 6,297,846 B1 | 10/2001 | Edanami | 348/239 |
| 6,473,114 B1* | 10/2002 | Strubbe | 348/14.07 |
| 6,677,979 B1 | 1/2004 | Westfield | 348/14.12 |
| 6,894,714 B2* | 5/2005 | Gutta et al. | 348/14.07 |
| 7,176,957 B2 | 2/2007 | Ivashin et al. | 348/14.09 |
| 7,349,008 B2* | 3/2008 | Rui et al. | 348/169 |
| 7,768,543 B2 | 8/2010 | Christiansen | 348/14.08 |
| 7,865,834 B1 | 1/2011 | van Os et al. | |
| 8,085,290 B2 | 12/2011 | Graham et al. | 348/14.01 |
| 8,106,856 B2* | 1/2012 | Matas et al. | 345/73 |
| 8,325,214 B2* | 12/2012 | Hildreth | 348/14.03 |
| 2001/0049087 A1* | 12/2001 | Hale | 434/350 |
| 2006/0251382 A1 | 11/2006 | Vronay et al. | |
| 2007/0118868 A1* | 5/2007 | Zhang et al. | 725/105 |
| 2008/0109728 A1* | 5/2008 | Maymudes et al. | 715/722 |
| 2008/0297588 A1* | 12/2008 | Kurtz et al. | 348/14.08 |
| 2008/0298571 A1* | 12/2008 | Kurtz et al. | 379/156 |
| 2010/0171807 A1 | 7/2010 | Tysso | |
| 2010/0245532 A1* | 9/2010 | Kurtz et al. | 348/14.03 |

(Continued)

FOREIGN PATENT DOCUMENTS

| | | | | |
|---|---|---|---|---|
| AU | 2008255262 A1 | 12/2008 | | H04N 7/00 |
| WO | WO 2012/049320 A1 | 4/2012 | | H04N 7/14 |

OTHER PUBLICATIONS

"Automating Camera Management for Lecture Room Environments": by Qiong Liu, Yong Rui, Anoop Gupta and JJ Cadiz; Collaboration and Multimedia Systems Group, Microsoft Research, 2001.

(Continued)

*Primary Examiner* — Binh Tieu
(74) *Attorney, Agent, or Firm* — Baker Botts L.L.P.

(57) ABSTRACT

A method for transition control in a videoconference comprises receiving a plurality of video streams from a plurality of cameras, displaying a first video stream of the plurality of video streams, detecting a stream selection event for display of a second video stream of the plurality of video streams, determining a transition category for a transition from the first video stream to the second video stream, and selecting a display transition based on the transition category for displaying the transition from the first video stream to the second video stream.

38 Claims, 4 Drawing Sheets

(56) References Cited

U.S. PATENT DOCUMENTS

| | | | |
|---|---|---|---|
| 2010/0309284 A1* | 12/2010 | Samadani et al. | 348/14.08 |
| 2011/0181602 A1* | 7/2011 | Boda et al. | 345/473 |
| 2012/0051719 A1 | 3/2012 | Marvit | |
| 2012/0182384 A1* | 7/2012 | Anderson et al. | 348/14.09 |
| 2012/0198338 A1* | 8/2012 | Flint et al. | 715/726 |
| 2013/0242064 A1* | 9/2013 | Herdy | 348/51 |
| 2013/0265378 A1* | 10/2013 | Abuan et al. | 348/14.02 |
| 2014/0111597 A1* | 4/2014 | Anderson et al. | 348/14.03 |

OTHER PUBLICATIONS

"Building an Intelligent Camera Management System": Yong Rui, Liwei He, Anoop Gupta and Qiong Liu; Collaboration and Multimedia Systems Group, Microsoft Research, 2001.

PCT Notification of Transmittal of Int'l Search Report and Written Opinion of the Int'l Searching Authority, or the Declaration, with attached Int'l Search Report and Written Opinion of the Int'l Searching Authority; Int'l appl. PCT/US2013/060262, Int'l filing date Sep. 18, 2013; (9 pgs), Jul. 17, 2014.

* cited by examiner

TRANSITION CONTROL IN A VIDEOCONFERENCE

TECHNICAL FIELD

The present disclosure relates generally to communication systems, and more particularly, to a method and system for transition control in a videoconference.

BACKGROUND

Film and television productions use a variety of visual transitions between scenes. Transitions may include cross-fades, wipes, and cuts. A director chooses each transition, and may use selected transitions for particular purposes. For example, a transition may convey a tone or mood, may suggest a change in location, or may imply the passage of time. Transitions may also be chosen for artistic reasons. In videoconferencing only one transition is typically used. This transition, a cut, is an instant change from one scene to the next.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF EXAMPLE EMBODIMENTS

The teachings of the present disclosure relate to transition control in a videoconference. During a videoconference a video stream displayed on a monitor at a participating site will often change from a first video stream to a second video stream. This change may occur automatically. For example, in some embodiments normal voice activity may trigger a switch between streams, and this switch may occur through a simple cut from a first to a second stream. In certain embodiments, a different transition may be used when the displayed video stream changes from a first to a second stream. Examples of transitions include wipes, fades, cross-fades, or any number of digital effects. Use of a particular transition may provide a non-verbal cue a participant viewing the displayed transition as to why a change occurred from a first video stream to a second video stream. For example, a participant viewing a change in a displayed video stream may understand from the type of transition displayed between a first stream to a second stream that a participant visible in the second video stream does not intend to interrupt the current speaker, who was visible in the first stream.

Thus, technical advantages of particular embodiments may include providing a participant with greater understanding of a reason associated with a change in video streams through the use of a particular transition. Applying the same or similar display transition consistently over time to a category of transitions may also provide contextual clues to a conference participant about the roles or intentions of other conference participants without explicit explanation. Applying a variety of transitions may also provide a conference with more natural feeling transitions between images of conference participants. Moreover, using a variety of display transitions may give the conference the appearance of a higher quality production or of a professionally produced experience.

Figure 1:
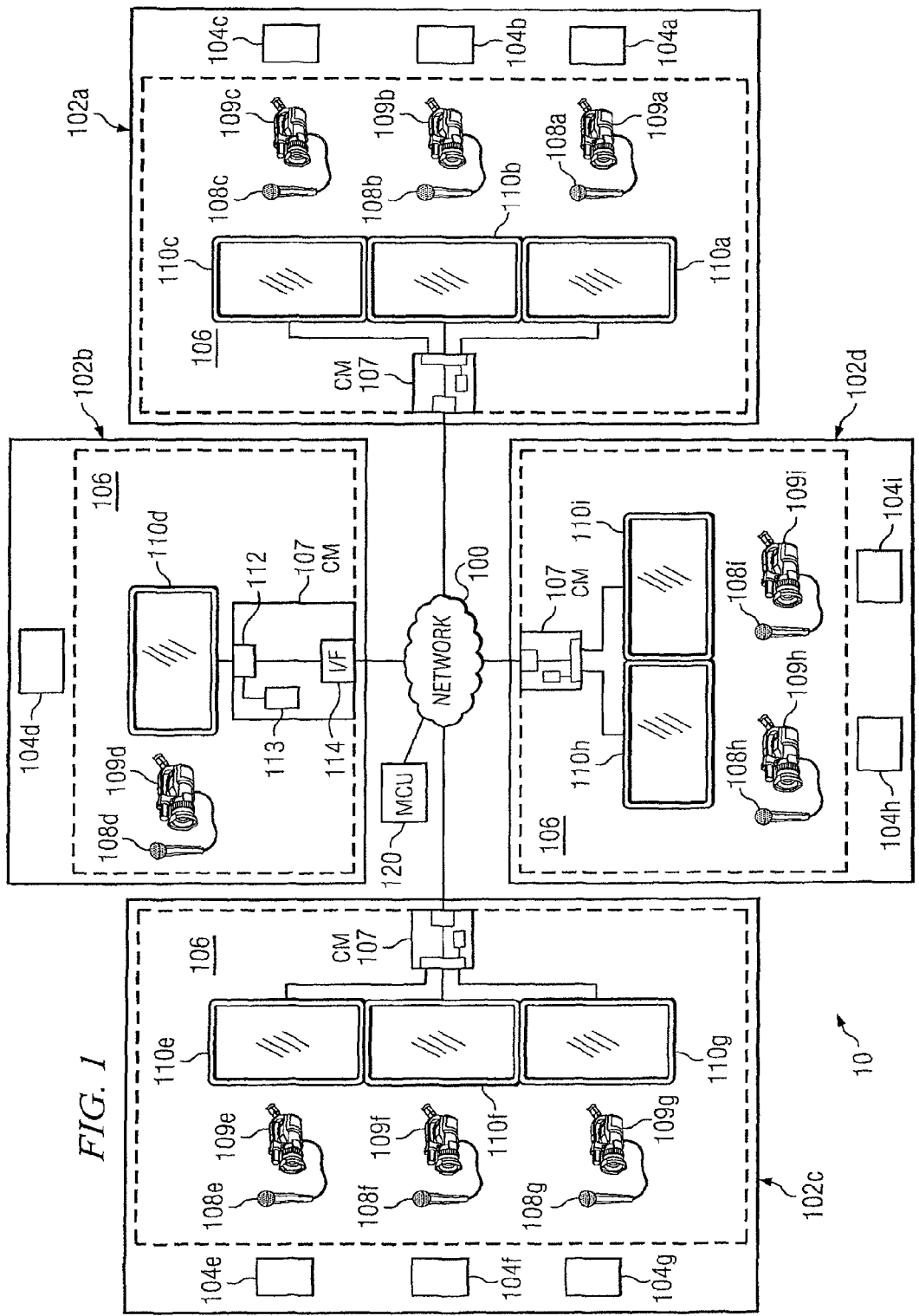
FIG. 1 illustrates a system for conducting a videoconference between sites, in accordance with particular embodiments.

FIG. 1 illustrates a communication system for conducting a conference between sites, in accordance with particular embodiments. Communication system 10 includes network 100, remote sites 102, users 104, conference equipment 106, and multipoint control unit (MCU) 120. Communication system 10 may support conferencing between remotely located sites 102 using conference equipment 106. As used herein, a "conference" may include any communication session between a plurality of users transmitted using any audio and/or video means, including signals, data and/or messages transmitted through voice and/or video devices, text and/or video chat, instant messaging, email, and other applications. Further, for purposes of this specification, audio and video signal(s) selected for transmission during a conference may be referred to respectively as the active audio and active video signals or streams, or collectively, as active streams or active video streams.

Network 100 represents communication equipment, including hardware and any appropriate controlling logic for interconnecting elements coupled to network 100 and facilitating communication between sites 102. In general, network 100 may be any network capable of transmitting audio and/or video signals, data, and/or messages associated with a conference. Accordingly, network 100 may include all or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate the described communication capabilities, network 100 may include routers, hubs, switches, gateways, call controllers, and/or any other suitable components in any suitable form or arrangement. Additionally, network 100 may represent any hardware and/or software configured to communicate information in the form of packets, cells, frames, segments, or other portions of data. Although network 100 is illustrated as a single network, network 100 may include any number or configuration of networks. Moreover, communication system 10 may include any number or configuration of networks similar to network 100. Network 100 provides users 104 with a realistic videoconferencing experience even though the number of monitors 110 at a local site 102 may be less than the number of video signals generated for the videoconference.

Sites 102 may include any suitable number of users 104 that may participate in multiple videoconferences. Users 104 represents one or more individuals or groups of individuals who may be present for a videoconference. Users 104 participate in the videoconference using any suitable device and/or component, such as audio Internet Protocol (IP) phones, video phone appliances, personal computer (PC) based video phones, and streaming clients. During the videoconference, users 104 may engage in the session as speakers or participate as non-speakers.

Sites 102 include conference equipment 106, which facilitates conferencing among users 104. Conference equipment 106 includes conference managers 107, microphones 108, cameras 109, and monitors 110. In particular embodiments, sites 102 may be referred to as endpoints or conference endpoints. In various embodiments, conference equipment 106 may include any suitable elements to establish and facilitate a conference at a site 102. For example, conference equipment 106 may include loudspeakers, user interfaces, controllers, microphones, speakerphones, any suitable hardware and/or software, or any combination of these items. Conference equipment 106 may include one or more network interfaces, memories, processors, codecs, or any other suitable hardware or software for videoconferencing between remote locations.

According to particular embodiments, conference equipment 106 may include any suitable dedicated conferencing devices. In operation, conference equipment 106 may establish a videoconference session using any suitable technology and/or protocol, such as Session Initiation Protocol (SIP) or H.323. Additionally, conference equipment 106 may support and be interoperable with other video systems supporting other standards, such as H.261, H.263, and/or H.264.

Conference managers (CM) 107 may communicate information and signals to and from network 100 and sites 102. CM 107 includes processor 112, memory 113, and interface 114. Processor 112 controls the operation and administration of conference equipment 106 by processing information and signals received from cameras 108 and interface 114. Processor 112 may include any suitable hardware and/or software to control and process signals. For example, processor 112 may be a programmable logic device, a microcontroller, a microprocessor, any suitable processing device, or any combination of the preceding. In various embodiments, processor 112 may include a transition controller and a transition generator. Memory 113 may store any data or logic used by processor 112 in providing videoconference functionality. In particular embodiments, memory 113 may store a transition map. In some embodiments, memory 113 may store all, or a portion, of a videoconference. Memory 113 may include any form of volatile or non-volatile memory including, without limitation, magnetic media, optical media, random access memory (RAM), read-only memory (ROM), removable media, or any other suitable local or remote memory component. Interface 114 communicates information and signals to network 100 and receives information and signals from the same. Interface 114 represents any port or connection, real or virtual, including any suitable hardware and/or software that allow conference equipment 106 to exchange information and signals with network 100, other conference equipment 106, and/or other elements of communication system 10.

In various embodiments, CM 107 may include any suitable hardware or software for managing a conference such as additional or different processors, memories, interfaces, or codecs. In operation, CM 107 may transmit and receive signals containing conference data to and from a site 102. In particular embodiments, the transmitted signals may be audio and video signals. The signals may be an analog or digital signals and may be compressed or uncompressed. In certain embodiments the audio and video signals are signals including media (audio and video) packets transmitted using Real-time Transport Protocol (RTP). RTP is a standardized packet format for transmitting audio and video packets over the Internet. While each CM 107 is depicted as residing at a site 102, a CM 107 may be located anywhere within communication system 10. In some embodiments, conference equipment 106 may include individual processors, memories, interfaces, or codecs and may not include a discrete CM 107.

Microphone 108 may be any acoustic to electric transducer or sensor operable to convert sound into an electrical signal. For the purposes of communication system 10, microphone 108 may capture the voice of a user 104 at a local site 102 and transform it into an audio signal for transmission to a remote site 102. While in the illustrated embodiment there is a microphone 108 for each user 104, a particular site 102 may have more or less microphones than users 104. Additionally, in certain embodiments, microphones 108 may be combined with any other component of conference equipment 106 such as cameras 109 or monitors 110.

Cameras 109 may include any suitable hardware and/or software to facilitate capturing an image of user 104 and the surrounding area. In certain embodiments, cameras 109 may capture and transmit the image of user 104 as a video signal. Depending on the embodiment, the transmitted video signal may include a separate signal (e.g., each camera 109 transmits its own signal) or a combined signal (e.g., the signal from multiple sources are combined into one video signal).

Monitors 110 may include any suitable hardware and/or software to facilitate receiving a video signal and displaying the image of a remote user 104 to users 104 at a local conference site. For example, monitors 110 may include a notebook PC, a tablet, a cellular phone, a wall mounted monitor, a floor mounted monitor, or a free standing monitor. Monitors 110 may display the image of a user 104 using any suitable technology that provides a realistic image, such as high definition, high-power compression hardware, and efficient encoding/decoding standards.

MCU 120 serves as an intermediary during a multipoint conference and facilitates the communication of audio and/or video signals between sites 102 while engaged in a conference. In operation, MCU 120 acts as a bridge which interconnects data signals from various conference sites. Specifically, MCU 120 collects audio and/or video signals transmitted by conference participants through their endpoints and distributes such signals to other participants of a multipoint conference at remote sites 102. MCU 120 may assign particular audio and/or video signals to particular monitors 110 or loudspeakers at a remote site 102.

In particular embodiments, MCU 120 may also analyze incoming audio and/or video signals to determine whether a stream selection event has occurred. A stream selection event is an event that indicates which video signal will be designated as the active stream, or the stream to be displayed, when transmitted to sites 102. MCU 120 may also identify a category for the transition between a first active steam for display to a second active stream for display. A transition category relates to the events that may be transpiring in one or more video streams that requires a transition from a first displayed video stream to a second displayed video stream. Based on the transition category, MCU 120 may select a display transition to display on a monitor 110 for transitioning from a first stream to a second stream on the monitor. A display transition is the manner in which a first video stream changes visually to a second video stream.

In particular embodiments, MCU 120 may identify a stream selection event for display of a second video stream and may transmit video signals that include a first and a second video stream without any specified transition. In these circumstances, a conference site may be able to detect a transition category based on the audio and video signals and display a corresponding display transition between the first and second video stream by utilizing the site's CM 107 or other suitable hardware or software. In these embodiments, CM 107 may use processor 112 or any suitable hardware and software to detect a transition between streams for display. This type of detection is well known in video encoders and is called scene change detection. One exemplary method for scene change detection may include evaluating the sum of the luma differences for all pixels from one frame to the next. If many pixels change luma, then a scene change or video switch may have transpired. Once CM 107 has determined that a transition has occurred, it may determine the transition category associated with the transition by extracting and analyzing information from the audio and video signals, similar to the extraction and analysis described in conjunction with media layer 243 and transition control layer 246 in FIG. 2. In various embodiments, CM 107 may select a display transition that corresponds with the identified transition category by referencing a transition map stored in memory, similar to the transition map described in greater detail in conjunction with FIG. 2. In certain embodiments, hardware and software used to perform any or all of these steps so as to select a display transition at a conference site may be a discrete entity within or separate from the CM 107 and may be called a transition generator. Technical advantages of this configuration may include selecting and displaying a variety of transitions at a particular site during a conference with a MCU that is not selecting and/or transmitting any display transitions more advanced than a basic cut. Allowing a participating site or endpoint to display a variety of display transitions may provide consistency for users at a site such that those users may begin to associate meaning with particular display transitions.

Modifications, additions, or omissions may be made to communication system 10. For example, communication system 10 may include any suitable number of sites 102 and may facilitate a videoconference between any suitable number of sites 102. As another example, sites 102 may include any suitable number of microphones 108, cameras 109, and monitors 110 to facilitate a videoconference. As yet another example, the videoconference between sites 102 may be point-to-point conferences or multipoint conferences. For point-to-point conferences, the number of displays 110 at local site 102 is less than the number of cameras 109 at remote site 102. For multipoint conferences, the aggregate number of cameras 109 at remote sites 102 may be greater than the number of displays 110 at local site 102. Moreover, the operations of communication system 10 may be performed by more, fewer, or other components. Additionally, operations of communication system 10 may be performed using any suitable logic.

Figure 2:
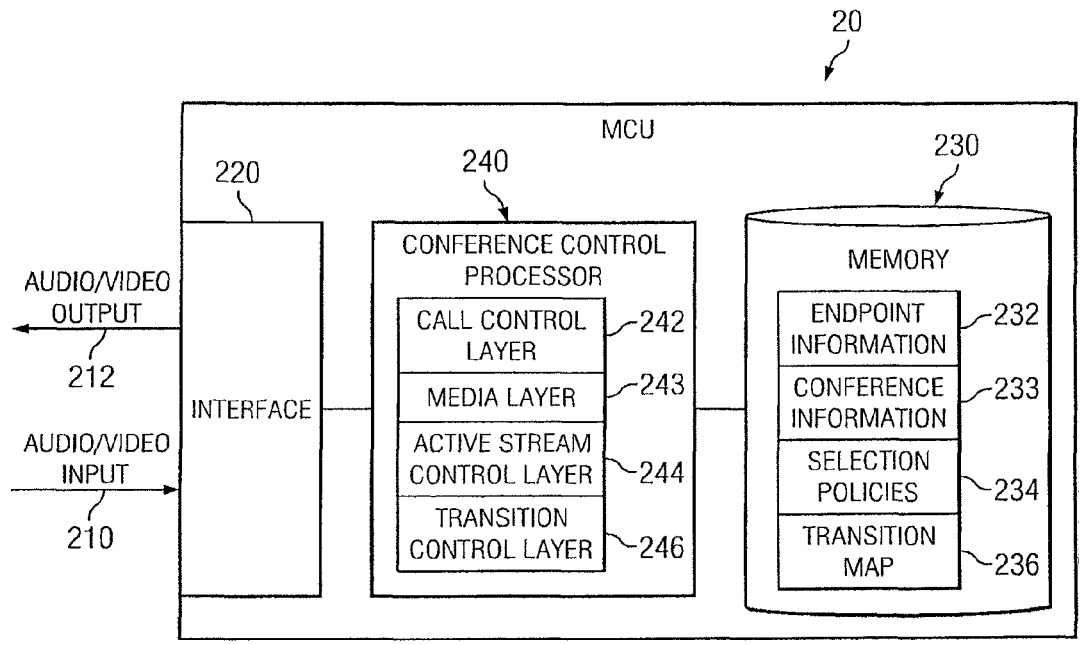
FIG. 2 illustrates a multipoint control unit in accordance with particular embodiments.

FIG. 2 illustrates a multipoint conference unit in accordance with particular embodiments. MCU 20 includes interface 220, conference control processor (CCP) 240, and memory 260. In certain embodiments, MCU 20 may be similar to MCU 120 described in conjunction with FIG. 1. Also illustrated in FIG. 2 are audio and video input signals 210 and audio and video output signals 212.

Interface 220 is capable of communicating information and signals to a communication network and receiving information and signals from a communication network such as network 100 of FIG. 1. Interface 220 is operable to receive one or more audio and/or video input signals 210 from one or more sites participating in a conference and/or to transmit one or more audio and/or video output signals 212 to one or more other sites participating in the conference. It should be noted that audio and video input signals 210 may be substantially similar to audio and video output signals 212. Interface 220 represents any port or connection, real or virtual, including any suitable hardware and/or software that allow MCU 20 to exchange information and signals with other devices in a communication system. Accordingly, interface 220 may be or include an Ethernet driver, universal serial bus (USB) drive, network card, and/or firewall.

Memory 230 includes endpoint information 232, conference information 233, selection policies 234, selection data 235, and a transition map 236. In certain embodiments, memory 230 may include other information. For example, it may store instructions for CCP 240 and/or any other information used by MCU 20. Memory 230 may include any collection and arrangement of volatile or non-volatile, local or remote devices suitable for storing data. Examples of memory 230 may include random access memory (RAM) devices, dynamic random access memory (DRAM), read only memory (ROM) devices, magnetic storage devices, optical storage devices, flash memory, or any other suitable data storage devices.

Endpoint information 232 includes any pertinent information on various endpoints to a conference, similar to those endpoints or sites described in conjunction with FIG. 1. In certain embodiments, endpoint information 232 may include a media forwarding table. A media forwarding table may be a directory, listing, or other index for routing audio and video signals to conference sites. For example, with respect to FIG. 1, media forwarding table may indicate that audio and video signals from site 102c should be directed to sites 102a and 102b. Media forwarding table may further indicate that an audio or video signal associated with a particular user 104 should be directed to a particular monitor 110 and/or loudspeaker at sites 102a and 102b. In certain embodiments, the media forwarding table may maintain separate routing listings for audio signals and their associated video signals. This may allow for a user at a local site to hear the voice of a speaker at a remote site without the image of the speaker appearing on one or more local monitors. Additionally, the media forwarding table may be dynamic. Thus, it may be modified or updated in response to a change in the active speaker(s) and/or according to any suitable user preferences. For example, in some embodiments, when a conference participant, for example user 104g at site 102c described in FIG. 1, begins to speak, media forwarding table may be updated so that the audio and video signals associated with user 104g are displayed on monitor 110d at site 102b. In certain embodiments, media forwarding table may be updated in conjunction with a stream selection event. Thus, for example, during a lecture, media forwarding table may be updated for a lecturing speaker and then be subsequently updated to route video signals of non-speaking participants while continuing to route the audio signals associated with the lecturing speaker. In some embodiments, media forwarding table may be a component of CCP 240's media layer or may be stored or reside anywhere within MCU 20. It may also be accessible to MCU 20 via communications with other components in a communication system, such as communication system 10 of FIG. 1.

Conference information 233 includes relevant information on past, current, or future conferences that may occur using a conference system similar to system 10 described in conjunction with FIG. 1. For example, conference information may include start and stop times, the anticipated number and/or location of participating endpoints or sites, the anticipated number of users at each site, any passcode or password information for hosts and/or participants, and any other suitable information. In particular embodiments, conference information 233 may be supplied to memory 230 by an external calendaring or scheduling source such as Microsoft Outlook, Google's calendar, or similar systems or technology.

Selection policies 234 includes information on what constitutes a stream selection event. A stream selection event may take place upon the occurrence of an audio or visual event. Various embodiments may include any number of stream selection events. Storing selection policies 234 in memory 230 allows MCU 20 to determine which video stream to select and/or transmit based on information extracted from incoming audio and video signals 210.

Transition map 236 includes information on transition categories and display transitions. More specifically, transition map 236 identifies a display transition for each transition category. Various embodiments may include any number of transition categories or display transitions. Examples of transition categories may include a conversation, a lecture, attendance categories such as initial roll call or new attendee, questioning, or participant request. Corresponding display transitions may include a cut, a fade-out or fade-in, a cross-fade, a cross-dissolve, a maximize/minimize, a wipe, or any number of digital effects. A display transition may also include a combination of transition types, for example a blur-dissolve, a glow-blur-dissolve, or a zoom-plus-dissolve, more commonly known as the Ken Burns effect after the American documentarian's use of this combination transition.

In particular embodiments, display transitions stored in transition map 236 may each have a unique visual appearance. For example, transition map 236 may store multiple crossfades each with a unique visual appearance such as a traditional dissolve (a gradual fade from one shot to the next) and a glow dissolve (a fade that peaks with a glow and then reveals the next shot). In various embodiments, transition map 236 may include any suitable number of transition categories and display transitions. In certain embodiments, each transition category may correspond to a unique display transition, and in some embodiments, multiple transition categories may correspond to one display transition. Display transitions stored in transition map 236 may be labeled in any descriptive or non-descriptive manner and may or may not correspond to the terms used in the television or film industries.

CCP 240 controls the operation of MCU 20 and includes a call control layer 242, a media layer 243, an active stream control layer 244, and a transition control layer 245. Each of these layers may be operable to perform one or more signal processing functions. In particular, CCP 240 processes information and signals received from microphones, cameras, and/or other conference equipment at sites participating in a conference. CCP 240 may include any suitable hardware, software, or both that operate to control and process signals. CCP 240 may include more, less, or other processing layers arranged in a protocol stack which perform various tasks associated with the processing of media signals. Further, each of the processing layers may include a separate processor, memory, hardware, or software for executing its intended functionality. Examples of CCP 240 include, but are not limited to, application-specific integrated circuits (ASICs), field-programmable gate arrays (FGPAs), digital signal processors (DSPs), and any other suitable specific or general purpose processors.

Call control layer 242 is a processing layer for managing communications to and from conference sites. In particular, call control layer 242 may decode address information and route communications from one conference site to another. Thus, when a site dials into or otherwise connects to a conference, call control layer 242 may connect the site to one or more remote sites for a conference.

Media layer 243 is a low level processing layer that receives one or more audio and/or video signals and extracts any relevant information for higher level processing. More specifically, media layer 243 may detect audio and/or video signals from one or more sites participating in a particular conference and extract information indicating a stream selection event has occurred. A stream selection event may indicate that the active video stream for display should be changed on one or more monitors at participating sites, similar to sites 102 in FIG. 1. This extracted information may be audio information, such as voice recognition of an addressee. For example, analysis of incoming audio and video signals may indicate that a speaker in the current active stream has addressed another conference participant: "John, what do you think?" Extracted information may be activity information detected from the video signal, such as detection of a raised hand. In certain embodiments, extracted information indicating a stream selection event may include both audio and video signals. Various embodiments may include any number of stream selection events. Examples of stream selection events may include voice activated switching; detection of a raised hand of a participant; identification of conference participants, for example, through a sequential selection of all participating endpoints or a joining of a new endpoint to a conference. In certain embodiments, media layer 243 may extract information indicating a stream selection event based on a conference mode. For example, when a videoconference includes one or more speakers speaking to a number of audience members (such as during a lecture) who may be joining the videoconference at one or more remote sites, the stream selection event may be a lecture mode. In various embodiments, the lecture mode stream selection event may be identified when one participant speaks or holds the floor for a specified amount of time, for example for two or more minutes, or when a speaker manually selects or identifies lecture mode. In another example, when a videoconference includes two or more speaking participants at two or more sites, the stream selection event may be a conversation mode. Each of these events may result in a designation of a second video stream as the active stream for transmission and/or display.

In the various embodiments, media layer 243 interfaces with one or more other layers in CCP 240 and may send extracted information to other layers, including the active stream control layer 244 for further processing. As may be evident, the active stream may change any number of times during the course of a conference. Therefore, media layer 243 may constantly monitor the audio and video signals associated with a conference.

Active stream control layer 244 is a higher level processing layer operable to analyze stream selection events forwarded by media layer 243. In particular, active stream control layer 244 may determine a primary output stream based on stream selection events from various audio and video signals associated with a particular conference. Based on a stream selection event, active stream control layer 244 may determine which of a plurality of audio and/or video signals to transmit to various sites participating in a conference. For example, in the exemplary stream selection event described in conjunction with media layer 243 where one videoconference participant addresses a second participant by name ("John, what do you think?"), active stream control layer 244 may designate a second video stream as the active stream for display. This second stream may include an image of the named participant, John, and may be captured by a camera at John's site, similar to the cameras 109 and sites 102 in FIG. 1. In another example, when media layer 243 extracts information indicating a vote is taking place among conference participants, active stream control layer 244 may sequentially designate the video stream from each participating site as the active stream such that participants at every site may be displayed casting their votes. Similarly, active stream control layer 244 may sequentially designate video streams from each participating site to identify all videoconference participants when an attendance roll call stream selection event occurs. In particular embodiments, active stream control layer 244 may also designate the duration a stream is deemed active. For example, during roll call, each and every participating endpoint may be shown for approximately five seconds, whereas during lecture mode, non-speaking participants may be shown for approximately ten seconds. In various embodiments, the duration of time a stream may be designated as an active stream may vary.

In certain embodiments, when media layer 243 extracts information indicating a stream selection event based on a conference mode, active stream control layer 244 may designate one or more video streams as active streams for display. For example, when the stream selection event is a lecture mode, active stream control layer 244 may select one or more streams of non-speaking conference participants, i.e. participants listening to the lecture, as the active stream for transmission and/or display.

In particular embodiments, active stream control layer 244 may not rely on any extracted information from the audio and/or video signals when selecting a stream for display. This may occur when the stream selection event for the display of a second video stream is elicited manually by a participating site, similar to sites 102 in FIG. 1. For example, a participant who is hosting a conference may manually select a particular stream for transmission to one or more endpoints or participating sites. Or a participant may manually select a preference for the stream containing his or her image, for example, a user might manually request to be shown, or to be excluded, during any display of non-speaking participants during a lecture. Some stream selection events may be time based. For example, in certain embodiments, after a designated period of time has elapsed, active stream control layer may designate an alternate camera angle of a speaker as the active stream or it may de-active a particular stream if no activity is detected within a set time period. In certain embodiments, active stream control layer 244 may also designate a video stream that includes presentation data rather than any image of a conference participant.

In various embodiments, active stream control layer 244 may select multiple video streams simultaneously as active streams. In this instance, multiple video streams may be compressed and displayed simultaneously to conference participants. This may occur when the active stream control layer 244 determines from information extracted by media layer 243 that a conversation is occurring between conference participants; the active stream control layer 244 may select video streams of both speakers in the conversation as active streams for display. Compression of multiple video streams may occur at MCU 20 before transmission via interface 220 to participating conference sites or it may occur at a participating site, for example at a participating site's conference manager similar to CM 107 discussed in conjunction with FIG. 1, or at any suitable location.

Upon determining which audio and/or video signals should be designated as the active stream for display, active stream control layer 244 may update media forwarding table in memory 230. This may be performed by communicating a status message containing relevant information to media layer 243. Such information may include an update, change or status confirmation regarding the active audio and active video signals. Responsive to the status message, media layer 243 may modify media forwarding table so that the audio and video signals associated with the active speaker are properly routed. In response to the update, media layer 243 may forward audio and/or video packets associated with audio and video input signal 210 so that they are distributed to the conference sites in accordance with the media forwarding table. The packets may then be distributed through audio and video output signals 212 via interface 220. In certain embodiments, audio and video signals may be separately designated as active streams. For example, active stream control layer 244 may identify an active audio stream and an active video stream for transmission where the active audio stream corresponds to one site and the active video stream corresponds to another. In some embodiments, active audio and video streams may correspond to the same site but to difference conference participants. This might occur for instance when media layer 243 extracts stream selection information indicating lecture mode or perhaps during an attendance event when one speaker is announcing the conference participants as each site or in any situation where one of ordinary skill in the art would recognize value in transmitting a video signal for display that is not affiliated with the active audio signal for transmission.

Transition control layer 246 is also a higher level processing layer operable to analyze changes in the active stream. In particular, transition control layer 246 determines a transition category for the transition from a first video stream to a second video stream. Various embodiments may include any number of transition categories. For example, a transition category of voting may occur when conference participants at one or more sites seek to cast a vote or preference during a videoconference. In other example, a transition category of conference roll call may occur when a videoconference host and/or participants seek to identify all attendees at the beginning of a videoconference or at any point during the videoconference. A transition category of new attendee may occur when an additional participant joins a videoconference already in progress. In some embodiments, transition categories like roll call and new attendee may be categorized as one transition category, for example a transition category of attendance. A transition category of conversation may occur when two or more participants initiate and maintain a dialogue among themselves. A transition category of lecture may occur when one participant addresses the other conference participants for some amount of time. A transition category of questioning may occur, for example, in an academic setting when a professor seeks to question participants about a subject or when participants seek to ask clarifying questions of a professor. An additional exemplary transition category of participant request may occur when a participant seeks to be shown to other participants or, alternatively, seeks not to be shown to other participants. In particular embodiments, transition map 236 may include and transition control layer 246 may determine any number or type of transition categories. In certain embodiments, an identified stream selection event may correspond to a transition category. For instance, in the exemplary stream selection event where a one participant addresses another conference participant by name, the transition category may be a conversation.

Utilizing transition map 236, transition control layer 246 identifies a display transition corresponding to the transition category. A display transition is the transition displayed on a monitor for replacing a scene from a first video stream with a scene from a second video stream. A display transition may be a cut where a shot from a first stream is replaced instantaneously with a shot from a second stream. A display transition may be a fade, where a shot from a first stream gradually fades to a single color such as black, white, or grey or a display of a single color screen fades to a shot from a video stream; in certain embodiments, these fades may be respectively referred to as a fade-out and fade-in. In some embodiments, a fade-out of a first stream may be followed by a fade-in of a second stream. In instances where a fade-out is followed very rapidly by a fade-in, the corresponding display transition may be referred to as a dip. A display transition may be a crossfade where a first stream fades directly to a second stream; a crossfade may also be referred to a mix, a dissolve, or a cross-dissolve. A display transition may be a wipe where a first stream is progressively replaced by a second stream. A display transition may include one or more digital effects such as focus changes or animation. A display transition may include a combination of transition types, for example, a first stream may become unfocused, dissolve to a second unfocused stream, the second stream then coming into focus. This example may be called a blur-dissolve.

Each display transition identified by transition control layer 246 may correspond to one or more transition categories. For example, for a conversation transition category where one participant addresses another conference participant, the corresponding display transition may be a wipe. The wipe might be a traditional wipe—a straight line moving from one side of the monitor to another, progressively replacing the first video stream with the second stream. For a new attendee transition category, the corresponding display transition may be a clock wipe, where the first stream is replaced by a second stream in a shape that follows the hands of a traditional timepiece. In embodiments including a lecture transition category, the corresponding display transition may be a cross-fade, such that an image of the lecturer fades out as an image of a listening lecture participant fades in.

In some embodiments, transition control map 236 may include a unique corresponding display transition for each transition category. Thus, transition control layer 246 may repeatedly identify the same or similar display transition for a particular transition category. Repeated use of the same or similar display transition for a particular transition category may result in additional context for conference participants. For example, if the same wipe, perhaps the traditional vertical line wipe described previously, is always used for a conversation, a user who sees a traditional wipe as a display transition may recognize without any additional visual or audio indicators that a conversation is occurring between the participants visible in the video streams. This may be advantageous if the conversation participants are not addressing each other by name or providing other verbal clues as to their interaction. Similarly, if the same display transition is consistently used in conjunction with new conference attendees, a user who sees a clock wipe may understand that a new attendee has joined a conference and is not attempting to begin speaking.

In certain embodiments, transition control map 236 may include multiple transition categories that share a display transition. Thus, transition control layer 246 may identify a similar display transition for one or more transition categories. For example, all attendance related transition categories, both initial roll call and new attendee, might utilize a similar display transition, for instance the clock wipe. In various embodiments, transition control layer 246 may identify a display transition for the transition from a first stream to a second stream where the second stream includes images of participants from multiple sites, similar to the second stream including multiple sites discussed in conjunction with active stream control layer 244. For example, transition control layer 246 may identify a consistent display transition for the conversation transition category when one or more active streams displayed include images from multiple sites. In addition to providing context to a user, consistent use of the same or similar display transition for a transition category or categories may also make the conference feel more natural. Further, in certain embodiments, using display transitions in this or a similar manner may promote a more professional feel for a conference, similar to a professionally produced film or television event.

In various embodiments, transition control map 236 may categorize certain transition categories as active and certain transition categories as passive. Active transition categories may include categories where a participant in a stream for display speaks or takes some action, for example where a participant speaks in a conversation. Passive transition categories may include categories where a participant in a stream for display may not have taken any affirmative action, for example, where a participant listens to a lecture. In various embodiments, transition control layer 246 may select a particular display transition for all active transition categories, for example a wipe, and may select a particular display transition for all passive transition categories, for example a cross-fade. Using two transitions consistently on this basis may provide additional context for videoconference participants who observe a display transition or transitions.

Once CCP 240 has selected an appropriate display transition, the transition display may be transmitted via interface 220 and audio/video output 212 to conference endpoint or sites participating the videoconference, similar to sites 102 in FIG. 1. In various embodiments, MCU 20 will transmit the selected display transition to all, some, or one of the participating sites for display as the transition between a first active stream and a second active stream.

In an example embodiment, MCU 20 may receive audio and video input signals 210 from multiple conference sites via interface 220. As mentioned, audio and video input signals 210 may be a stream of media packets which include audio and video data generated at a local site for transmission to a remote site. Upon receiving audio and video input signals 210, interface 220 may forward the signals to CCP 240 for processing. Media layer 242 may then detect whether the audio and video signals are associated with a particular conference. Following detection, media layer 242 may extract audio and visual information in order to identify any stream selection events from any or all of the signals. After identifying any stream selection events, media layer 242 may forward the event information to active stream control layer 244. Active stream control layer 244 may rely on the extracted data from media layer 242 and identifies active stream or streams for transmission and/or display. Transition control layer 246 identifies a transition category and references transition map 236 to select a corresponding display transition.

In another example embodiment, MCU 20 may interact with other components of a communication system, such as communication system 10 described in conjunction with FIG. 1. In this example, users at sites remote from each other initiate a conference. When user join the conference, a video signal is generated for each camera. A user, for example user 104c at site 102a described in FIG. 1, begins to speak and a video stream including an image of user 104c is displayed on monitor 110d at site 102b and on at least one monitor 110 at sites 102c and 102d. While user 104c is speaking, MCU 20 detects a stream selection event (e.g. user 104h at site 102d raises his hand) for display of a second video stream (the second video stream includes an image of user 104h). MCU 20 next identifies a transition category. Based on the transition category, MCU 20 selects a display transition for transmission to participating sites, such that monitors at sites 102, which have been displaying a video stream of user 104c speaking, display the selected display transition and then display a video stream of user 104h with his hand raised. Following the transition, while monitors display a video stream with user 104h, users at participating sites may continue to hear audio content from the speaker, user 104c, even though they no longer see user 104c. In this example, the selected display transition may afford users at remote sites an indication that user 104*h*, with his raised hand, hopes to speak, does not intend to interrupt, and/or will wait to be addressed by the speaker, user 104*c*. The additional context that may be provided through the consistent use of display transitions may provide a conference experience more similar to a true face-to-face conference and may improve the efficiency of communication during a conference.

In certain embodiments, MCU 20 may be configured in any suitable way. For example, memory 230 may store more, less, or different information. CCP 240 may perform more, less, or different functionalities and may be configured in any suitable fashion, in particular CCP 240 may include more, less, or different layers, or the described layers may perform various functionalities and may interact in any suitable way with any CCP layer or component of an MCU. In particular embodiments, MCU 20 will select any number of suitable transition displays for any number of transition categories. MCU 20 may transmit a selected transition display to participating conference endpoints. In certain embodiments, the primary transition selected and/or displayed may be a cut. In some embodiments, a cut may be used in addition to a variety of other transitions. In particular embodiments, a cut may be wholly replaced by a variety of other transitions.

Figure 3A:
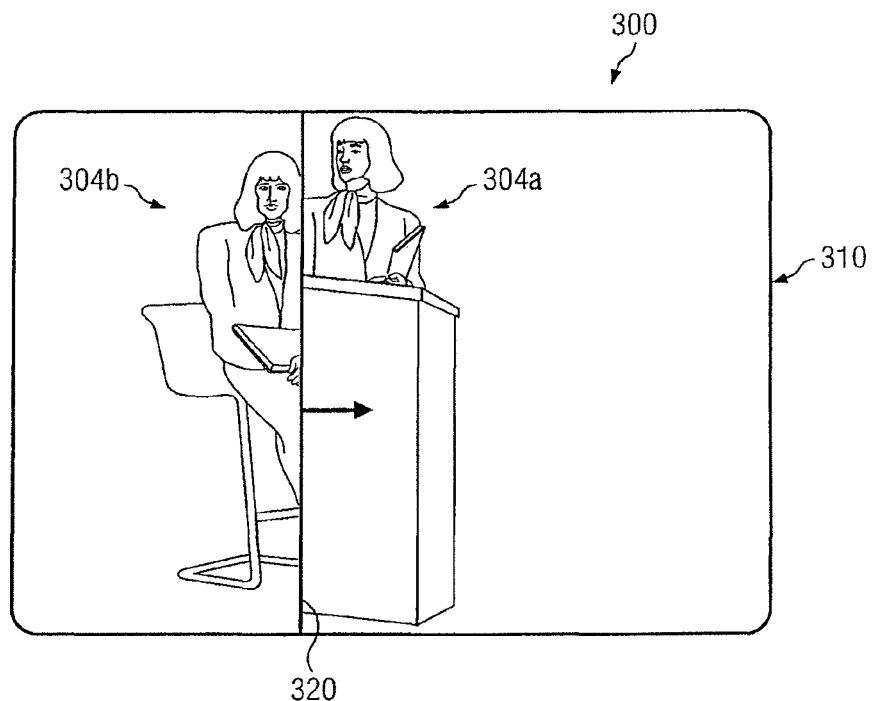
FIGS. 3a, 3b, and 3c illustrate exemplary display transitions in accordance with particular embodiments.

FIG. 3*a* illustrates a display transition 300 in accordance with particular embodiments. FIG. 3*a* includes conference participant 304*a*, conference participant 304*b*, monitor 310, and wipe 320. In FIG. 3*a*, the image on monitor 310 is transitioning from the display of participant 304*a* to participant 304*b*. Participants 304*a* and 304*b* may be similar to users 104 discussed in conjunction with FIG. 1. Participants 304*a* and 304*b* may be at conference sites remote from each other or they may be at the same site.

Wipe 320 is the display transition creating the transition or change between the display of participants 304*a* and 304*b*. Wipe 320 is a straight vertical line moving across monitor 110 from left to right, progressively replacing an image of participant 304*a* with an image of participant 304*b*. In particular embodiments, wipe 320 may be a thicker line or may have a colored border so as to better assist a viewer in distinguishing between images during the transition. In certain embodiments, wipe 320 may be any type of wipe including a straight vertical, horizontal, or diagonal line moving across the display or a complex shape or geometric pattern that appears to replace a first video stream with a second. Utilizing a wipe as a display transition may provide certain contextual clues to a view. For example, in certain embodiments, a wipe may indicate the changing of location.

Figure 3B:
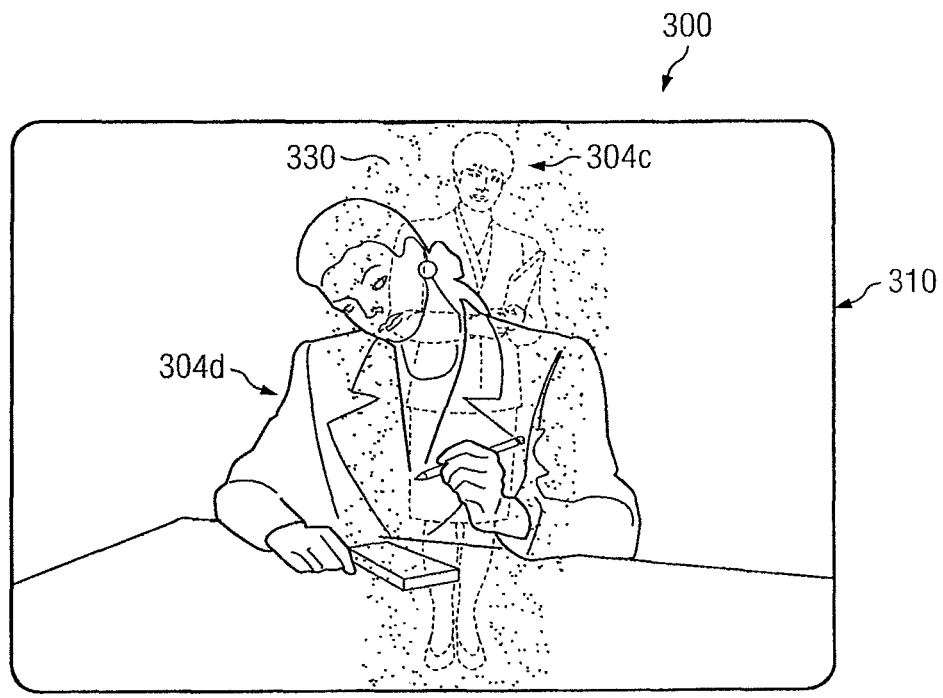

FIG. 3*b* illustrates a display transition 300 in accordance with particular embodiments. FIG. 3*b* includes conference participant 304*c*, conference participant 304*d*, monitor 310, and crossfade 320. In FIG. 3*b*, the image on monitor 310 is transitioning from an image of participant 304*c* to an image of participant 304*d*. Participants 304*c* and 304*d* may be similar to users 104 discussed in conjunction with FIG. 1. Participants 304*c* and 304*d* may be at conference sites remote from each other or they may be at the same site.

Crossfade 330 is the display transition creating the transition or change between the display of participants 304*c* and 304*d*. Crossfade 330 is a gradual fade-out of an image of participant 304*c*, a standing individual, and a simultaneous gradual fade-in of participant 304*d*, a individual seated at a desk. Crossfades may convey a sense of passing time or changing location. Crossfades may be used to signal a form of a "montage," or showing of multiple views of a scene or multiple scenes. Thus, crossfades may be appropriate for showing a sampling of an audience, for example during a lecture. In certain embodiments, crossfades may be used for any suitable transition category or categories.

Figure 3C:
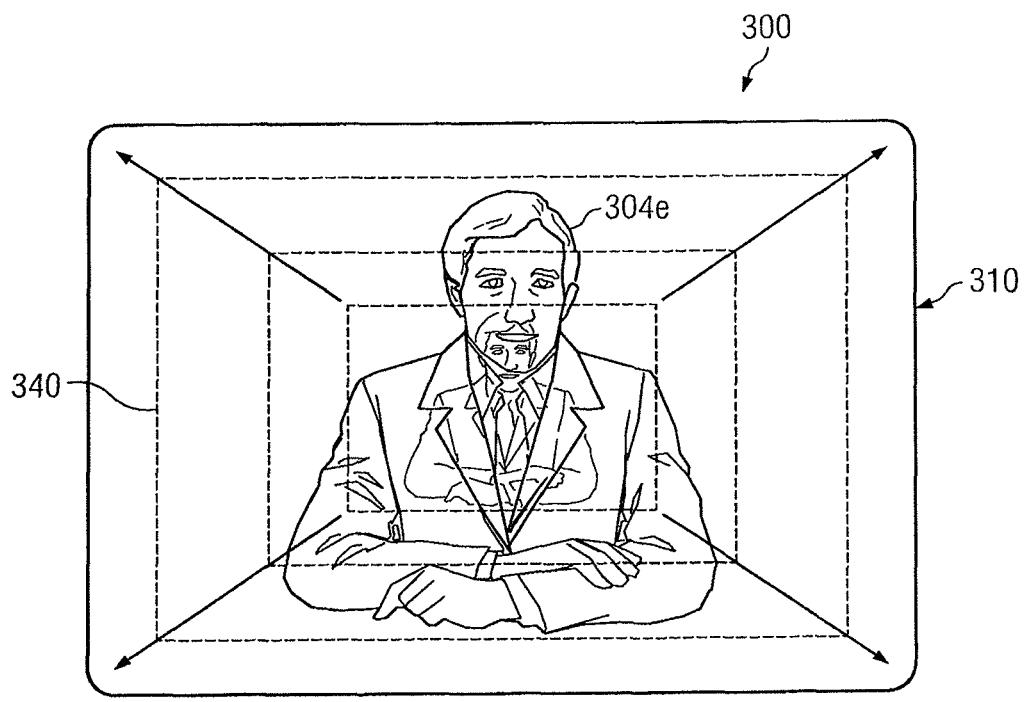

FIG. 3*c* illustrates a display transition 300 in accordance with particular embodiments. FIG. 3*c* includes conference participant 304*e*, monitor 310, and maximize transition 340. Participant 304*e* may be similar to a user 104 discussed in conjunction with FIG. 1.

Maximize transition 340 is a display transition that transitions from a displayed image to an image of participant 304*e*. Maximize transition 340 expands in size proportionally from a small image in the middle of monitor 310 to an image that fully occupies monitor 310. In some embodiments, maximize transition 340 may begin when another image is currently displayed on monitor 310 or it may begin when monitor 310 is displaying a blank or single color screen. In certain embodiments, a maximize transition may begin with a small image of a participant located in a non-center position, such as one corner of the monitor, that grows in size proportionally as well as moving toward the center of the monitor. Maximize transitions may indicate that a new user has joined a meeting or may indicate that the participant in the image wishes to speak.

In certain embodiments, a maximize transition may include images of two speakers such that an image of a first participant appears generally on one half of a monitor and an image of a second participant appears generally on the other half of a monitor. When one of the participants speaks, the image of the speaking participant is maximized at least slightly and the image of the nonspeaking participant is minimized at least slightly. Thus, while both participants remain displayed on a monitor, a user receives an additional non-auditory clue about which participant is the speaking or active participant. This may prove useful from a context standpoint. It may also be advantageous from a more pragmatic standpoint: because the image of the speaking participant is larger a user may have an easier time understanding what the speaking participant is saying. Moreover, this increased understanding may be afforded a conference participant without losing the image of the non-speaking participant with whom the speaking participant engages.

As will be evident to one of ordinary skill in the art, the available display transitions far exceed these three example embodiments. As similarly discussed in conjunction with FIGS. 1 and 2, by consistently using a particular display transition as the display transition for certain a transition category or categories, viewers may come to draw additional context for viewing the wipe as transition between two screens. For example, viewers may understand better why a transition is occurring or may understand that certain event or portion of a conference is transpiring. Existing conference equipment may include multiple monitors at a site and may feature a video stream of an active speaker on the primary or often middle monitor. In this configuration, the image of the most recent previous speaker is often relegated to display on a secondary or side monitor, remaining there until the active speaker because the most recent previous speaker. Using display transitions to provide context to a user may eliminate the possibility of an extended and/or arbitrary display of a most recent previous speaker and may increase a user's understanding of the various roles of one or more conference participants.

Figure 4:
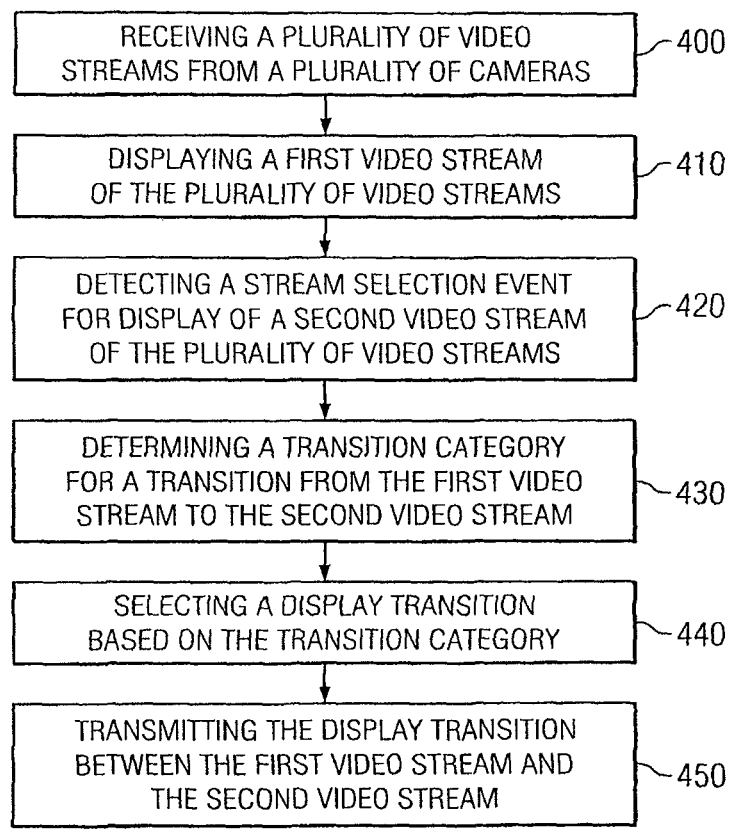
FIG. 4 is a flowchart illustrating a method for selecting a display transition.

FIG. 4 is a flowchart illustrating a method for selecting a display transition. The method begins at step 400 with receiving a plurality of video streams from a plurality of cameras. At step 410, a first video stream of a plurality of video streams is displayed. This may occur at one or more monitors at one or more videoconference sites, similar to monitors 110 at sites 102 illustrated in FIG. 1.

At step 420, a stream selection event for display of a second video stream of the plurality of video streams is detected, similar to the detecting of a stream selection event described in conjunction with FIGS. 1 and 2. For example, in certain embodiments, analysis of audio and video streams may indicate that a speaker in a current active stream has addressed another participant by name. In some embodiments, analysis of audio and video streams may indicate that a participant has made a hand gesture indicating his desire to speak or indicating his agreement with a proposal or motion presented for a vote.

Step 430 includes determining a transition category for a transition from the first video stream to the second video stream. For example, in various embodiments, a MCU or an endpoint similar to those described in FIGS. 1 and 2 may detect a conversation between participants in a first video stream and second video stream and identify a conversation transition category. In particular embodiments, the transition category may include a lecture where one videoconference participant is speaking to listening participants at one or more sites. In some embodiments, the transition category may include attendance such that monitors, similar to monitors 110 described in conjunction with FIG. 1, display video streams of videoconference participants.

Step 440 includes selecting a display transition based on the transition category. For example, a MCU may identify a particular transition category. It may then consult a transition map, similar to the transition map described in FIG. 2. The transition map may include a display transition corresponding to the particular transition category. For example, in certain embodiments, the transition map may identify a wipe as the display transition corresponding to a conversation transition category. Particular embodiments may utilize any number of display transitions, including wipes, crossfades, transitions that include combinations of various transition types, or any suitable transition.

Step 450 includes transmitting the display transition to an endpoint. In some embodiments, a MCU may transmit the selected display transition to one or more of the sites participating in a videoconference, similar to sites 102 illustrated in FIG. 1. In particular embodiments, a MCU does not transmit a display transition. In these embodiments, an endpoint may determine a transition category and display transition independent of the MCU.

Step 460 includes displaying on at least one monitor the display transition from the first video stream to the second video stream. In various embodiments, the consistent display of a selected display transition may provide visual context to videoconference participants. For example, upon seeing a display transition typically associated with attendance transition categories, a videoconference participant may understand that a subsequently displayed video stream includes a videoconference attendee who has joined an in-progress videoconference and that the participant or participants in the subsequently displayed video stream do not intend to speak or take any other action at that time.

Some of the steps illustrated in FIG. 4 may be combined, modified, or removed where appropriate, and additional steps may also be performed in any suitable order without departing from the scope of the invention. Technical advantages of particular embodiments may provide a videoconference participant with an increased understanding of a reason associated a change in video streams through the use of a particular transition. Applying a particular display transition consistently over time to a transition category or categories may also provide contextual clues to a conference participant about the roles or intentions of other conference participants without explicit explanations. Utilizing a variety of transitions may also provide a conference with more natural feeling transitions between images of conference participants. Although a cut may remain a display transition for a new active speaker, where a quick transition may be desired, for other transition that may occur with less frequency and/or that are less time sensitive, a slower display transition may be pleasing to the viewing participants. Moreover, using a variety of display transitions may also give the conference the appearance of a higher quality production or of a professionally produced experience.

Although the present disclosure has been described in detail with reference to particular embodiments, it should be understood that various other changes, substitutions, and alterations may be made hereto without departing from the spirit and scope of the disclosure. For example, although particular embodiments of the disclosure have been described with reference to a number of elements included in a conference system, these elements may be combined, rearranged, or positioned in any suitable order to accommodate particular conferencing requirements or needs. Various embodiments contemplate great flexibility in the conference system and its components. Additionally, while some embodiments are described with respect to a video conference between remote sites, particular embodiments may be used for various speakers at one site or to record a conference at various sites. Further, while transition categories and display transitions are discussed in accordance with particular embodiments, any identifiable transition category and/or display transition may be used.

What is claimed is:

1. A system comprising:
an interface operable to receive a plurality of video streams from a plurality of cameras;
at least one monitor operable to display a first video stream of the plurality of video streams, the first video stream including a display of a first user at a first location; and
a memory storing:
a plurality of transition categories for a transition from the first video stream to the second video stream, each transition category indicating a type of transition from the first video stream to a second video stream of the plurality of video streams; and
a plurality of display transitions each associated in a one-to-one fashion with a corresponding one of the plurality of transition categories, wherein each display transition is indicative of the display category to which the display transition is associated, each of the display transitions being different; and
a processor coupled to the interface and operable to:
detect a stream selection event for display of a second video stream of the plurality of video streams, the second video stream including a display of a second user at a second location;
determine a transition category for a transition from the first video stream including the display of the first user at the first location to the second video stream including the display of the second user at the second location, the transition category indicating a type of transition from the first video stream to the second video stream, the determined transition category being one of voting, roll call, new attendee, conversation, and lecture; and select a display transition from the plurality of stored display transitions based on the transition category for displaying the transition from the first video stream including the display of the first user to the second video stream including the display of the second user, wherein the display transition comprises visual effects showing a transition on the at least one monitor from the first video stream to the second video stream.

2. The system of claim 1, wherein the processor is further operable to transmit the display transition to an endpoint.

3. The system of claim 1, wherein the at least one monitor is further operable to display the display transition from the first video stream to the second video stream.

4. The system of claim 1, wherein a processor operable to determine a transition category for transition from the first video stream to the second video stream comprises a processor operable to:
analyze the first and second video streams; and
detect a conversation between the first and second video streams;
wherein the transition category comprises a conversation.

5. The system of claim 1, wherein the stream selection event comprises one of the following: audible recognition of a spoken name, detection of a hand gesture, sequential selection of video streams from the plurality of cameras, addition of an endpoint to a videoconference, or manual video stream selection at an endpoint.

6. The system of claim 1, wherein the transition category comprises questioning such that an endpoint signals an intention to direct a question to a participant in the first video stream of the plurality of video streams.

7. The system of claim 1, wherein the transition category comprises roll call such that two or more video streams from a plurality of endpoints are identified for sequential display.

8. The system of claim 1, wherein the transition category comprises lecture such that a participant in the first video stream of the plurality of video streams addresses a participant in a second video stream for a particular amount of time.

9. The system of claim 1, wherein the display transition allows for visibility of at least a portion of the first video stream and at least a portion of the second video stream during the transition.

10. The system of claim 9, wherein the display transition is a wipe.

11. The system of claim 9, wherein the display transition is a crossfade.

12. The system of claim 9, wherein the display transition comprises a combination of multiple transition types.

13. A method comprising:
storing:
a plurality of transition categories for a transition from the first video stream to the second video stream, each transition category indicating a type of transition from the first video stream to a second video stream of the plurality of video streams; and
a plurality of display transitions each associated in a one-to-one fashion with a corresponding one of the plurality of transition categories, wherein each display transition is indicative of the display category to which the display transition is associated, each of the display transitions being different; and
receiving a plurality of video streams from a plurality of cameras;
displaying a first video stream of the plurality of video streams, the first video stream displaying a first user at a first location;
detecting a stream selection event for display of a second video stream of the plurality of video streams, the second video stream displaying a second user at a second location;
determining a transition category for a transition from the first video stream displaying the first user to the second video stream displaying the second user, the transition category indicating a type of transition from the first video stream to the second video stream, the determined transition category being one of voting, roll call, new attendee, conversation, and lecture; and
selecting a display transition from the plurality of stored display transitions based on the transition category for displaying the transition from the first video stream displaying the first user to the second video stream displaying the second user, wherein the display transition comprises visual effects showing a transition from the first video stream to the second video stream, the visual effects indicative of the transition category.

14. The method of claim 13, further comprising transmitting the display transition to an endpoint.

15. The method of claim 13, further comprising displaying on at least one monitor the display transition from the first video stream to the second video stream.

16. The method of claim 13, wherein determining a transition category for transition from the first video stream to the second video stream comprises:
analyzing the first and second video streams; and
detecting a conversation between the first and second video streams;
wherein the transition category comprises a conversation.

17. The method of claim 13, wherein the stream selection event comprises one of the following: audible recognition of a spoken name, detection of a hand gesture, sequential selection of video streams of the plurality of cameras, addition of an endpoint to a videoconference, or manual video stream selection at an endpoint.

18. The method of claim 13, wherein the transition category comprises questioning such that an endpoint signals an intention to direct a question to a participant in the first video stream of the plurality of video streams.

19. The method of claim 13, wherein the transition category comprises roll call such that two or more video streams from a plurality of endpoints are identified for sequential display.

20. The method of claim 13, wherein the transition category comprises lecture such that a participant in the first video stream of the plurality of video streams addresses a participant in a second video stream for a particular amount of time.

21. The method of claim 13, wherein the display transition allows for visibility of at least a portion of the first video stream and at least a portion of the second video stream during the transition.

22. The method of claim 21, wherein the display transition is a wipe.

23. The method of claim 21, wherein the display transition is a crossfade.

24. The method of claim 21, wherein the display transition comprises a combination of multiple transition types.

25. A non-transitory, tangible computer readable medium comprising code operable to:
a memory, storing:
a plurality of transition categories for a transition from the first video stream to the second video stream, each transition category, indicating a type of transition from the first video stream to a second video stream of the plurality of video streams; and a plurality of display transitions each associated in a one-to-one fashion with a corresponding one of the plurality of transition categories, wherein each display transition is indicative of the display category, to which the display transition is associated, each of the display transitions being different; and receive a plurality of video streams from a plurality of cameras;

display a first video stream of the plurality of video streams;

detect a stream selection event for display of a second video stream of the plurality of video streams;

determine a transition category for a transition from the first video stream to the second video stream; and select a display transition from the plurality of stored display transitions based on the transition category for displaying the transition from the first video stream including the display of the first user to the second video stream including the display of the second user, wherein the display transition comprises visual effects showing a transition from the first video stream to the second video stream.

26. The medium of claim 25, further comprising code operable to transmit the display transition between to an endpoint.

27. The medium of claim 25, further comprising code operable to display on at least one monitor the display transition from the first video stream to the second video stream.

28. The medium of claim 25, wherein code operable to determine a transition category for transition from the first video stream to the second video stream comprises code operable to:

analyze the first and second video streams; and detect a conversation between the first and second video streams;

wherein the transition category comprises a conversation.

29. The medium of claim 25, wherein the stream selection event comprises one of the following: audible recognition of a spoken name, detection of a hand gesture, sequential selection of video streams of the plurality of cameras, the addition of an endpoint to a videoconference, or manual video stream selection at an endpoint.

30. The medium of claim 25, wherein the transition category comprises questioning such that an endpoint signals an intention to direct a question to a participant in the first video stream of the plurality of video streams.

31. The medium of claim 25, wherein the transition category comprises roll call such that two or more video streams from a plurality of endpoints are identified for sequential display.

32. The medium of claim 25, wherein the transition category comprises lecture such that a participant in the first video stream of the plurality of video streams addresses a participant in a second video stream for a particular amount of time.

33. The medium of claim 25, wherein the display transition allows for visibility of at least a portion of the first video stream and at least a portion of the second video stream during the transition.

34. The medium of claim 33, wherein the display transition is a wipe.

35. The medium of claim 33, wherein the display transition is a crossfade.

36. The medium of claim 33, wherein the display transition comprises a combination of multiple transition types.

37. The system of claim 1, wherein the plurality of stored transition categories comprises at least three of voting, roll call, new attendee, conversation, and lecture.

38. The system of claim 1, wherein the plurality of stored transition categories comprise voting, roll call, new attendee, conversation, and lecture.

\* \* \* \* \*